(12) United States Patent
Toyoda et al.

(10) Patent No.: US 7,061,132 B2
(45) Date of Patent: Jun. 13, 2006

(54) RECIPROCATING ENGINE TYPE ELECTRIC GENERATOR

(75) Inventors: Yasunobu Toyoda, Anjo (JP); Yoshinobu Nakano, Toyota (JP); Yasuo Yokoi, Hirakata (JP)

(73) Assignees: Aisin Seiki Kabushiki Kaisha, Kariya (JP); Nihon Inverter Corporation, Hirakata (JP)

(*) Notice: Subject to any disclaimer, the term of this patent is extended or adjusted under 35 U.S.C. 154(b) by 119 days.

(21) Appl. No.: 10/901,987

(22) Filed: Jul. 30, 2004

(65) Prior Publication Data
US 2005/0023835 A1 Feb. 3, 2005

(30) Foreign Application Priority Data
Jul. 30, 2003 (JP) ............................. 2003-203968

(51) Int. Cl.
*H02P 9/44* (2006.01)
(52) U.S. Cl. ...................... 290/40 C; 290/40 F; 322/20
(58) Field of Classification Search ............. 290/40 C, 290/40 A, 40 D, 40 F, 31; 322/14, 15, 20
See application file for complete search history.

(56) References Cited

U.S. PATENT DOCUMENTS

| | | | |
|---|---|---|---|
| 4,977,508 A * | 12/1990 | Tanaka et al. ............... 701/111 |
| 4,994,684 A * | 2/1991 | Lauw et al. .................. 290/52 |
| 5,543,703 A * | 8/1996 | Kusase et al. ................ 322/16 |
| 5,739,677 A * | 4/1998 | Tsutsui et al. ................ 322/25 |
| 5,751,069 A * | 5/1998 | Rajashekara et al. ..... 290/40 C |
| 5,789,881 A * | 8/1998 | Egami et al. ............... 318/139 |
| 6,051,951 A * | 4/2000 | Arai et al. ................... 318/700 |
| 6,278,194 B1 * | 8/2001 | Nakagawa et al. ........... 290/31 |
| 6,365,983 B1 * | 4/2002 | Masberg et al. .......... 290/40 C |
| 6,713,888 B1 * | 3/2004 | Kajiura ..................... 290/40 F |
| 6,825,575 B1 * | 11/2004 | Edelson .................... 290/40 C |
| 6,940,259 B1 * | 9/2005 | Suzuki et al. ................ 322/20 |

FOREIGN PATENT DOCUMENTS

JP 3396156 2/2003

OTHER PUBLICATIONS

Patent Abstracts of Japan, JP 2002-238167, Aug. 23, 2002.

\* cited by examiner

*Primary Examiner*—Nicholas Ponomarenko
(74) *Attorney, Agent, or Firm*—Oblon, Spivak, McClelland, Maier & Neustadt, P.C.

(57) ABSTRACT

A reciprocating engine type electric generator includes means for recognizing a phase difference between a phase of an alternate voltage wave generated at a stator coil following rotation of a rotor and a phase of a reference alternate voltage, and means for controlling a speed of a rotational magnetic field generated at the stator coil by controlling the alternate voltage applied to the stator coil based upon the phase difference recognized by the means for recognizing the phase difference.

17 Claims, 5 Drawing Sheets

US 7,061,132 B2

RECIPROCATING ENGINE TYPE ELECTRIC GENERATOR

CROSS REFERENCE TO RELATED APPLICATIONS

This application is based on and claims priority under 35 U.S.C. §119 with respect to a Japanese Patent Application 2003-203968, filed on Jul. 30, 2003, the entire content of which is incorporated herein by reference,

FIELD OF THE INVENTION

This invention generally relates to a reciprocating engine type electric generator for generating electricity by use of a reciprocating engine.

BACKGROUND

In a co-generation system, a reciprocating engine type electric generator has been conventionally utilized, which generates electricity by use of a reciprocating engine. This type of reciprocating engine type electric generator is disclosed in Japanese Patent laid-Open Publication No. 2002-238167. This reciprocating engine type electric generator includes a reciprocating engine having a piston, an electric generator having a stator coil and a rotor and generating an alternate voltage at a stator coil following rotation of the rotor, and an engine starter. The rotor of the electric generator is connected to the piston of the reciprocating engine via a crankshaft. Therefore, the rotor is operated in association with a movement of the piston.

The reciprocating engine is applied with a relatively large load when it is initially activated. Therefore, the starter is required for the purpose of starting the engine. More. particularly, the starter starts the reciprocating engine by rotating a ring gear at a minimum rotational speed. When the engine rotational speed is stabilized after a while, the starter operation is stopped, and electricity is extracted from the electric generator. In general, the starter is employed only when the reciprocating engine is initially activated, and the starter operation is stopped when the engine rotation is stabilized.

According to the above-described technology, when the reciprocating engine is started, the starter is necessary to stabilize the engine rotation. However, the starter and components attached thereto may cause increase of the manufacturing cost of the reciprocating engine. Further, in light of characteristics of the starter, it is necessary to maintain the starter and the components attached thereto.

Meanwhile, when a brushless DC motor is activated, electric voltage to be applied to the stator coil is controlled in response to a rotational position of a rotor of the motor. Therefore, it is indispensable to obtain the rotational position of the rotor. In this case, a sensor such as a Hall element is equipped adjacent to the rotor and detects the rotational position of the rotor. However, when the sensor is equipped as described above, wire interconnection around there may become complicated. Further, a working temperature of the sensor, and further the environment in which the motor is used may be restricted.

In light of foregoing, recent developments have led to a technology by which the brushless DC motor is controlled without employing the sensor such as the Hall element, i.e., in a sensor-less control manner. However, when the brushless DC motor is employed for activating the reciprocating engine, it seems to be difficult for the brushless DC motor to be controlled properly without employing the sensor. The background of this result is described below.

When the piston of the reciprocating engine heads to a top dead center, the rotational speed of the rotor connected to the piston is decreased rapidly and instantly. While the piston has exceeded the top dead center, the rotational speed of the rotor is increased rapidly and instantly. Therefore, the information of the rotor rotational position relatively widely fluctuates when the piston is operated in the vicinity of the top dead center.

A need thus exists for providing a reciprocating engine type electric generator that does not require a starter and components attached thereto, a sensor such as a Hall element, and can prevent a rotor rotational speed from deviating from a rotational magnetic field generated at a stator coil.

SUMMARY OF THE INVENTION

According to an aspect of the present invention, a reciprocating engine type electric generator includes a reciprocating engine including at least one cylinder block having a cylinder bore, and a piston disposed in the cylinder bore of the cylinder block and reciprocating between a top dead center and a bottom dead center, and an electric generator including at least one stator coil and a rotor connected to the reciprocating engine and mounted with at least one permanent magnet rotated following the reciprocation of the piston, wherein the electric generator generates an alternate voltage at the stator coil following the rotation of the rotor. The reciprocating engine type electric generator further includes means for recognizing a phase difference between a phase of the alternate voltage wave generated at the stator coil following the rotation of the rotor and a phase of a reference alternate voltage, and means for controlling a speed of a rotational magnetic field generated at the stator coil by controlling the alternate voltage applied to the stator coil based upon the phase difference recognized by the means for recognizing the phase difference.

According to another aspect of the present invention, the stator coil is divided into three coil portions for generating a first three-phase alternate voltage, a second three-phase alternate voltage and a third-three phase alternate voltage. The means for recognizing the phase difference includes a different phase alternate voltage wave generating circuit for generating a first different phase alternate voltage wave of which phase is different from a phase of the first three-phase alternate voltage, a second different phase alternate voltage wave of which phase is different from a phase of the second three-phase alternate voltage, and a third different phase alternate voltage wave of which phase is different from a phase of the third three-phase alternate voltage. The means for recognizing the phase difference further includes a first Exclusive-OR circuit for generating an Exclusive-OR output with a square wave of the first reference three-phase alternate voltage compared to the first three-phase alternate voltage and a square wave of the first different phase alternate voltage wave, a second Exclusive-OR circuit for generating an Exclusive-OR output with a square wave of the second reference three-phase alternate voltage compared to the second three-phase alternate voltage and a square wave of the second different phase alternate voltage wave, a third Exclusive-OR Circuit for generating an Exclusive-OR output with a square wave of the third reference three-phase alternate voltage compared to the third three-phase alternate voltage and a square wave of the third different phase alternate voltage Wave, and an adding circuit for summing the output wave of the first Exclusive-OR circuit, the output wave of the second Exclusive-OR circuit, and the output wave of the third Exclusive-OR circuit, The adding circuit outputs a phase difference between the phase of the three-phase alternate voltage generated at the stator coil and the phase of the reference alternate voltage.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figures 1A, 1B, 1C:
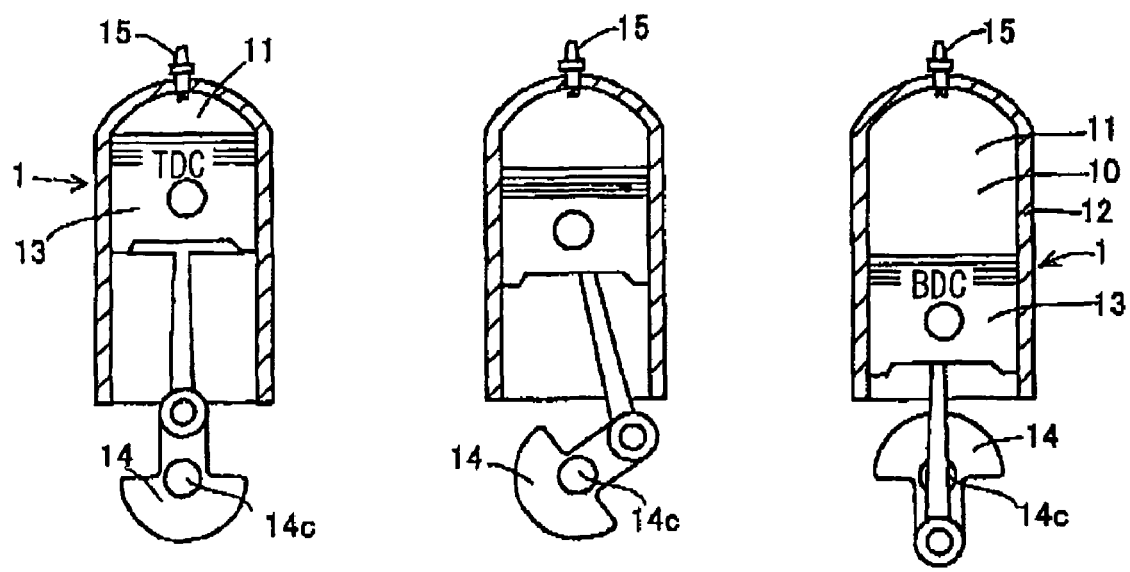
FIGS. 1A, 1B, and 1C are cross sectional views schematically illustrating a reciprocating engine according to an embodiment of the present invention, FIG. 1A illustrating a piston positioned at a top dead center, FIG. 1B illustrating the piston between the top dead center and a bottom dead center, and FIG. 1C illustrating the piston positioned at the bottom dead center.

As illustrated in FIG. 1, a reciprocating engine 1 according to the embodiment of the present invention includes at least one cylinder block 12 defining a cylinder bore 10 therein, a piston 13 disposed in the cylinder bore 10 of the cylinder block 12 in a reciprocating manner, a crankshaft 14 having a journal 14c, and at least one spark plug 15. The piston 13 of the cylinder block 12 reciprocates between a top dead center (TDC) and a bottom dead center (BDC). An engine combustion chamber 11 is defined above the piston 13 in the cylinder bore 10 of the cylinder block 12, as illustrated in FIG. 1. A rotation of the crankshaft 14 is converted into a reciprocation of the piston 13. Therefore, the crankshaft 14 serves as a converting mechanism for converting its rotation into the reciprocation of the piston 13. The reciprocating engine 1 according to the embodiment of the present invention can be activated with a fuel gas such as a town gas or with a liquid fuel such as gasoline and diesel oil, as non-limiting examples.

Figure 3:
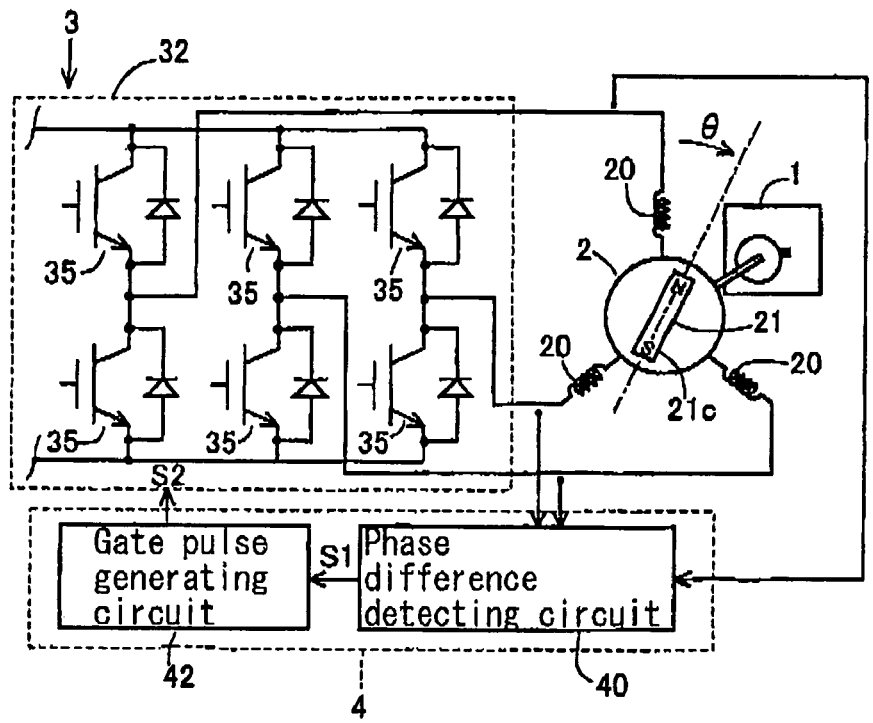
FIG. 3 is a system view schematically illustrating a substantial part of the system of the reciprocating engine type electric generator.

As explained in FIG. 3, an electric generator 2 according to the embodiment of the present invention is provided with a brushless motor (a brushless DC motor) as a main component and includes a rotor 21 and three stator coils 20 arranged with an equal distance relative to the next positioned stator coil. Each of the stator coils 20 has the identical number of winding. The rotor 21 includes at least one permanent magnet 21c (e.g. 16 poles). As described above, the rotor 21 is connected to the crankshaft 14 of the engine 1. Although not shown, the rotor 21 is substantially coaxially arranged with the crankshaft 14, according to the embodiment of the present invention. However, the rotor 21 does not necessarily have to be arranged substantially coaxially with the crankshaft 14. The rotor 21 rotates at 360-degree while the piston 13 reciprocates at one cycle.

Figure 2:
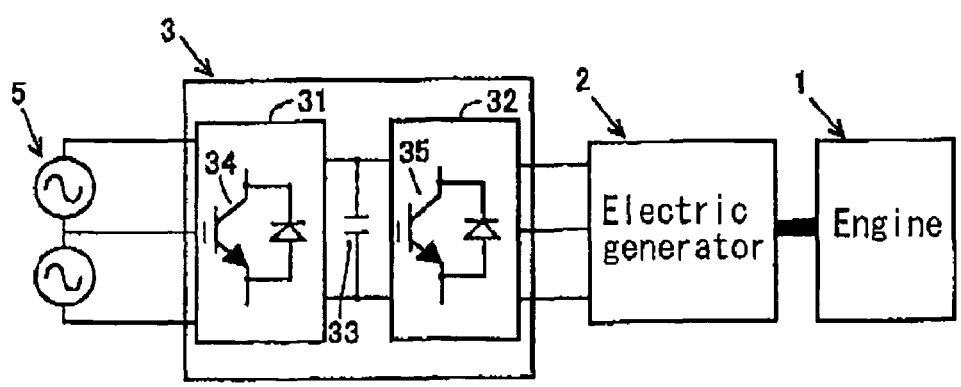
FIG. 2 is a system view schematically illustrating a system of a reciprocating engine type electric generator according to the embodiment of the present invention.

As illustrated in FIG. 2, the system of the reciprocating engine type electric generator according to the embodiment of the present invention includes an inverter 3 adjusted to regenerate electricity. The inverter 3 is provided with a first converter 31, a second converter 32, and a smoothing condenser 33 shared by the first converter 31 and the second converter 32. The first converter 31 is equipped with plural switching elements 34 (e.g. Insulated Gate Bipolar Transistors, i.e., IGBT) while the second converter 32 is equipped with plural switching, elements 35 (e.g. IGBT).

When the stopped reciprocating engine 1 is initially activated, an alternate voltage applied from an electric power supply 5 as a commercial power supply is rectified into a direct-current voltage by the converting portion 31. The electric power supply 5 possesses 100 volts as a root mean square value. The condenser 33 reduces ripple contained in the direct-current voltage. As aforementioned, the direct-current voltage rectified by the first converter 31 is converted into the alternate voltage having a target frequency by the second converter 32. The alternate voltage is then applied to the stator coils 20 of the electric generator 2. A rotational magnetic field is hence generated at the stator coils 20, wherein the rotor 21 mounted with the permanent magnets 21c rotates. As described above, the inverter 3 according to the embodiment of the present invention acts as means for rotating the rotor 21 when the reciprocating engine 1 starts.

As explained in FIG. 3, a controller 4 is provided with a phase difference detecting circuit 40 and a gate pulse generating circuit 42. The phase difference detecting circuit 40 acts as means for recognizing a phase difference by comparing a phase of a reference alternate voltage wave with a phase of an alternate voltage wave generated at the stator coils 20 following the rotation of the rotor 21. The gate pulse generating circuit 42 generates gate pulses S2 for operating the switching elements 35 based upon a signal S1 of the phase difference detecting circuit 40. The signal S1 represents a current position of the rotor 21. The gate pulses S2 are inputted into the gates of the switching elements 35 of the second converter 32 so as to turn on the switching elements 35.

In general, the reciprocating engine 1 requires relatively large torque for starting the reciprocation of the piston 13. Therefore, it may be difficult to start the operation of the piston 13 only by combustion pressure in the engine combustion chamber 11 of the cylinder block 12. In light of foregoing, according to the embodiment of the present invention, when the reciprocating engine 1 is initially activated, the three-phase alternate voltage is applied to the stator coils 20 via the electric power supply 5 and the inverter 3 so that the rotational magnetic field is generated at the stator coils 20. The rotor 21 with the permanent magnets 21c follows the rotational magnetic field at the stator coils 20 and rotates around the stator coils 20. When the rotor 21 of the electric generator 2 rotates as described above, the piston 13 starts reciprocating via the crankshaft 14 mechanically connected to the rotor 21. As a result, the piston 13 reciprocates between the TDC and the BDC of the reciprocating engine 1. That is, the electric generator 2 acts as a starter for starting the reciprocating engine 1. When the activation of the reciprocating engine 1 is stabilized after a while, the electric generator 2 does not have to be activated as the starter any more. Therefore, the voltage apply to the stator coil 20 is finished.

When the activation of the reciprocating engine 1 is stabilized, the electricity generated by the electric generator 2 is extracted. The rotor 21 with the permanent magnet 21c is operated by the reciprocating piston 13 so as to rotate among the stator coils 20. Therefore, the three-phase alternate voltage is generated at the stator coils 20 in accordance with Fleming's right-hand rule, wherein electricity is generated, The three-phase alternate voltage is rectified to the direct-current voltage by the second converter 32, and the ripple contained in the direct-current voltage is reduced by the condenser 33. The direct-current voltage is then converted to the alternate voltage with a predetermined frequency by the first converter 31. The alternate voltage is employed for assisting the electric power supply 5 or on behalf of the electric power supply 5. As described above, the electricity is generated at the electric generator 2.

Figure 4:
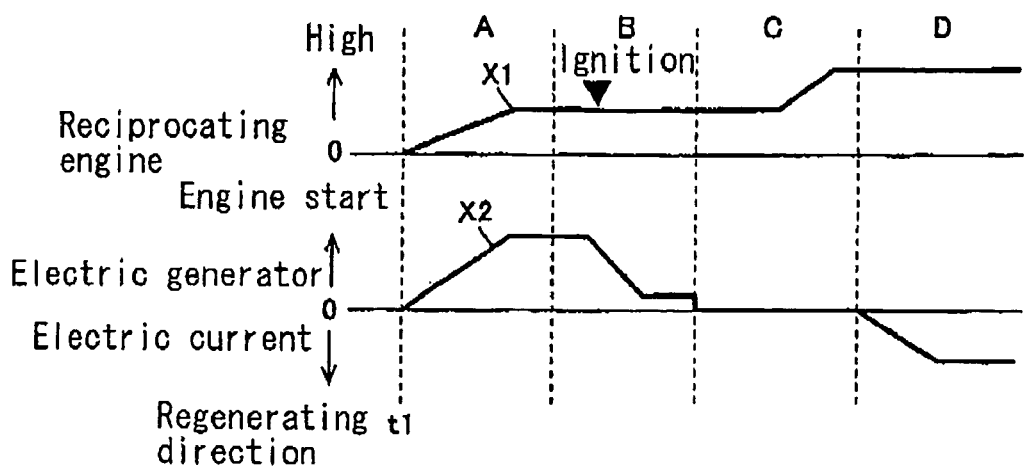
FIG. 4 is a diagram for explaining a process for initially activating the reciprocating engine according to the embodiment of the present invention.

In FIG. 4, a characteristic line X1 indicates shift of an rpm of the reciprocating engine 1 (e.g. an rpm of the crankshaft 14 is referred to as the engine rpm) while a characteristic line X2 indicates shift of current value of the alternate current supplied to the stator coil 20 or generated at the stator coil 20. Both of the reciprocating engine 1 and the electric generator 2 are under stationary states at a time t1. When the electric generator 2 is activated as the starter, the rpm of the reciprocating engine 1 is gradually increased and is raised up to a target rpm (e.g. an idle rpm) (Period A). When the reciprocating engine 1 is ignited, the electric generator 2 does not have to be activated as the starter any more. Therefore, the current supplied to the electric generator 2 is gradually decreased down to zero (Period B). The rotation of the reciprocating engine 1 is then stabilized after a while (Period C). The electricity generated at the electric generator 2 is then extracted while the rpm of the reciprocating engine 1 has been maintained within a certain speed range (Period D). When the electricity generated at the electric generator 2 is extracted, the rpm of the reciprocating engine 1 is maintained at the certain speed range between 1200 rpm and 2000 rpm.

When the electric generator 2 is driven as the starter for the reciprocating engine 1, the rotational position of the rotor 21 relative to the stator coils 20 is not always explicit. In this case, it may be difficult to efficiently and appropriately rotate the rotor 21 by the rotational magnetic fields generated at the stator coils 20. Conventionally, when the reciprocating engine is initially activated, a sensor such as a Hall element has been provided for detecting a rotational position of a rotor based upon a signal outputted from the sensor.

However, according to the embodiment of the present invention, the reciprocating engine 1 can be initially activated without using a sensor such as the Hall element. That is, the electric generator 2 acts as the starter for initially activating the reciprocating engine 1. More particularly, the controller 4 applies electric voltage to the stator coils so as to generate the rotational magnetic field at the stator coils 20 as needed when the reciprocating 1 is initially activated. Therefore, the rotor 21 rotates around the stator coils 20.

When the rotor 21 mounted with the permanent magnets 21c rotates, induced electromotive force is generated at the three stator coils 20 in accordance with Fleming's right-hand rule. Therefore, when the reciprocating engine 1 is started, the phase difference detecting circuit 40 recognizes the phase difference by comparing the phase of the alternate voltage wave generated at the stator coils 20 following the rotation of the rotor 21 and a phase of the reference alternate voltage. The controller 4 obtains the current position of the rotor 21 relative to the stator coils 20 based upon the phase difference.

The controller 4 then turns on and off the switching elements 34 of the first converter 31 and the switching elements 35 of the second converter 32 based upon the current position of the rotor 21 relative to the stator coils 20. Therefore, even when the reciprocating speed of the piston 13 instantly fluctuates in the vicinity of the TDC, the speed of the rotational magnetic field at the stator coils 20 can be effectively and substantially synchronized with the rotational speed of the rotor 21, thereby enabling to prevent the rotational timing of the rotor 21 from deviating from the speed of the rotational magnetic field at the stator coils 20. Therefore, the reciprocating engine 1 can be activated in a good manner.

Further, the above description will be applied to the case when the electricity generated at the electric generator 2 is extracted. Even when the rotational speed of the rotor 21 instantly varies in a state where the piston 13 is positioned in the vicinity of the TDC, the controller 4 turns on and off the switching elements 34 of the first converter 31 and the switching elements 35 of the second converter 32 based upon the current position of the rotor 21 relative to the stator coils 20, thereby enabling to extract the electricity generated at the electric generator 2 in a good manner.

Figure 5:
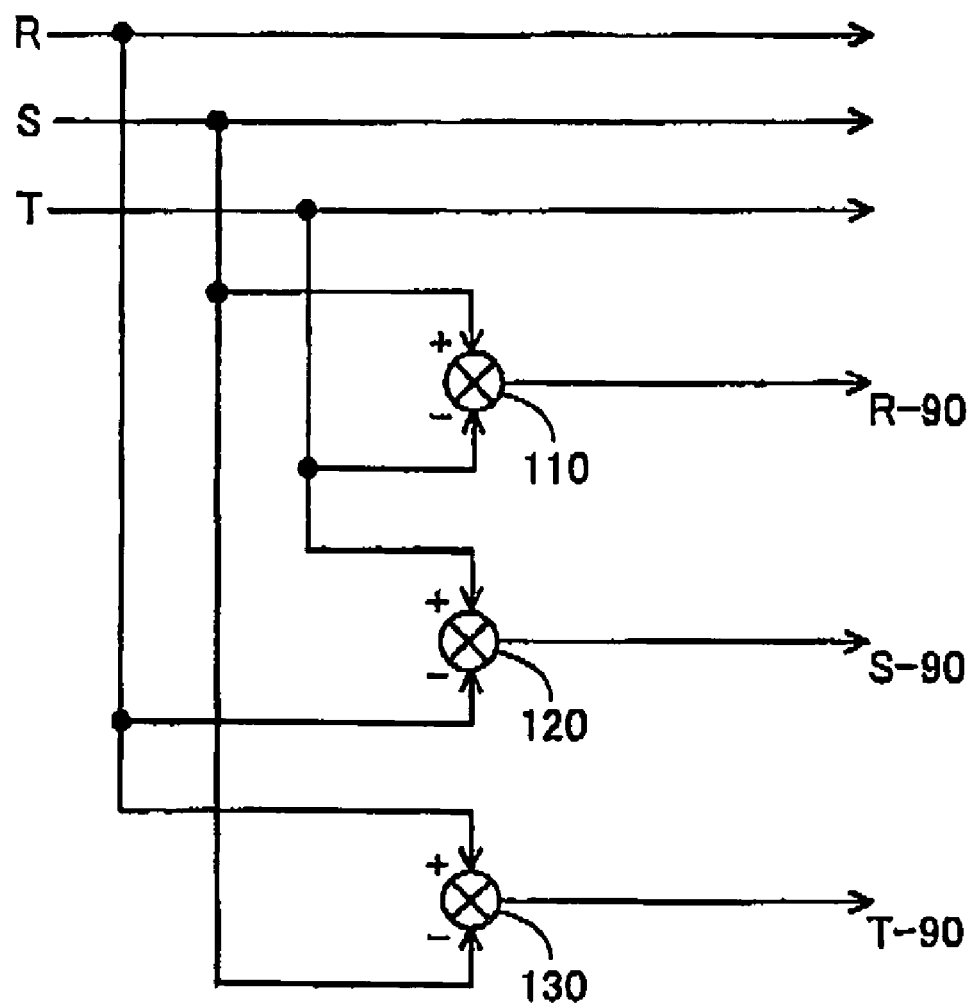
FIG. 5 is a view illustrating a phase difference detecting Circuit according to the embodiment of the present invention.

Following description will be given for describing the operation of the phase difference detecting circuit 40 of the controller 4 with reference to FIGS. 5 and 6. As illustrated in FIG. 5, references R, S and T represent sine waves, each of which constructs the three-phase alternate voltage actually generated at the stator coils 20 in response to the rotation of the rotor 21. Hereinafter, the sine wave R is referred to as a first three-phase alternate voltage R, the sine wave S is referred to as a second three-phase alternate voltage S and the sine wave T is referred to as a third three-phase alternate voltage T. The phase difference detecting circuit 40 is provided with a first 90-degree phase circuit 110, a second 90-degree phase circuit 120 and a third 90-degree phase circuit 130. The first 90-degree phase circuit 110 is adjusted to generate a first different phase alternate voltage wave R-90) of which phase is delayed at 90-degree relative to the first three-phase alternate voltage R. The second 90-degree phase circuit 120 is adjusted to generate a second different phase alternate voltage wave (S-90) of which phase is delayed at 90-degree relative to the second three-phase alternate voltage S. The third 90-degree phase circuit 130 is adjusted to generate a third different phase alternate voltage wave (T-90) of which phase is delayed at 90-degree relative to the third three-phase alternate voltage T. Each of the first, second and third 90-degree phase circuits 110, 120 and 130 is formed with a subtracting circuit as a different phase alternate voltage wave generating circuit.

As illustrated in FIG. 5, the first 90-degree phase circuit 110 computes the first different phase alternate voltage wave (R-90) by subtracting the sine waves S and T from the sine wave R. The second 90-degree phase circuit 120 computes the second different phase alternate voltage wave (S-90) by subtracting the sine waves T and R from the sine wave S. The third 90-degree phase circuit 130 computes the third different phase alternate voltage wave (T-90) by subtracting the sine waves R and S from the sine wave T.

References r, s and t in FIG. 5 represent sine waves, each of which constructs the reference three-phase alternate voltage. Hereinafter, the sine wave r is referred to as a first reference three-phase alternate voltage r, the sine wave s is referred to as a second reference three-phase alternate voltage s and the sine wave t is referred to as a third reference three-phase alternate voltage t. The first different phase alternate voltage wave (R-90) is compared with the sine wave r, the second different phase alternate voltage wave (S-90) is compared with the sine wave s, and the third different phase alternate voltage wave (T-90) is compared with the sine wave t.

Figure 6:
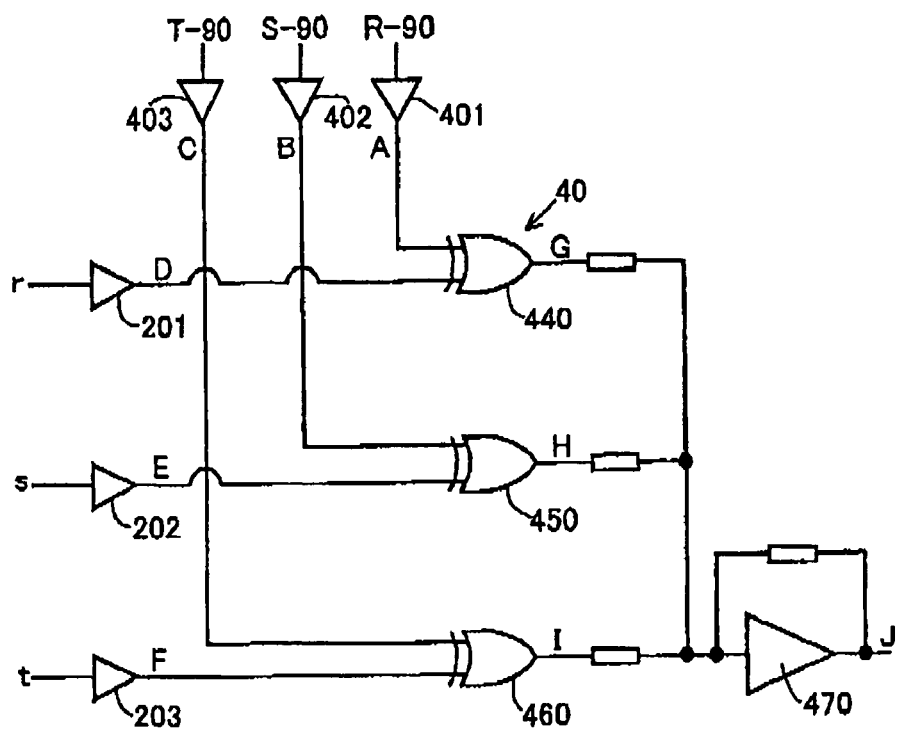
FIG. 6 is an Exclusive-OR at the phase difference detecting circuit.

As illustrated in FIG. 6, converters 401, 402 and 403 of the phase difference detecting circuit 40 forms each of the sine waves (R-90), (S-90) and (T-90) into a square wave. A square wave A represents the square wave of the sine wave (E-90), a square wave B represents the square wave of the sine wave (S-90) and a square wave C represents the square wave of the sine wave (T-90). Further, converters 201, 202 and 203 of the phase difference detecting circuit 40 forms each of the sine wave r, s and t into a square wave. A square wave D represents a square wave of the sine wave r, a square wave E represents a square wave of the sine wave s and a square wave F represents a square wave of the sine wave t.

As illustrated in FIG. 6, the phase difference detecting circuit 40 is provided with a first Exclusive-OR circuit (EXOR) 440, a second Exclusive-OR circuit (EXOR) 450, a third Exclusive-OR circuit (EXOR) 460 and an adding circuit 470. Each of the first, second and third EXOR 440, 450 and 460 outputs a high signal only when input signals do not correspond to each other while each of them outputs a low signal only when input signals correspond to each other. As illustrated in FIG. 6, the square waves A and D are inputted into the first EXOR 440, the square waves B and E are inputted into the second EXOR 450 and the square waves C and F are inputted into the third EXOR 460. Therefore, the first EXOR 440 outputs a square wave G, which indicates that the square wave A does not correspond to the square wave D. The second EXOR 450 outputs a square wave H, which indicates that the square wave B does not correspond to the square wave E. The third EXOR 460 outputs a square wave I, which indicates that the square wave C does not correspond to the square wave F. These outputted square waves G, R and I are inputted into the adding circuit 470, and a sum of the square waves G, H and L is computed as a square wave J without being digitized. Therefore, the phase difference at the three-phase alternate voltage generated at the stator coils 20 can be detected.

As described above, according to the embodiment of the present invention, the phase difference can be detected at a relatively high speed by the phase difference detecting circuit 40. Therefore, a cutoff frequency of a low pass filter can be designed at a relatively higher value than a conventionally referred frequency value, thereby enabling to obtain the current position of the rotor 21 at a higher speed. Therefore, the instant rotational speed change of the rotor 21 can be effectively absorbed by the phase difference detecting circuit 40 when the piston 13 is positioned in vicinity of the TOD, according to the embodiment of the present invention.

Figure 7:
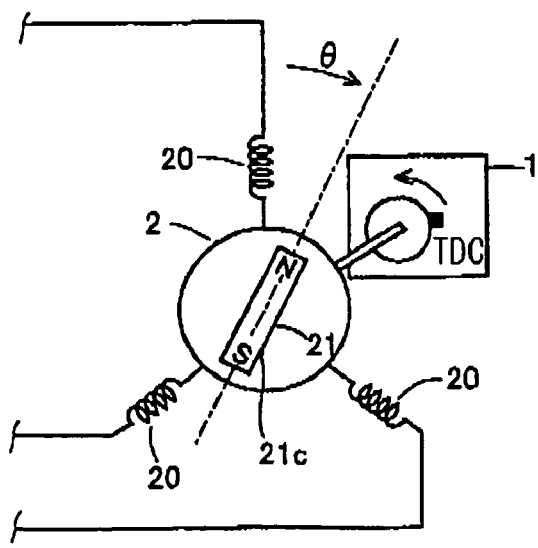
FIG. 7 is a diagram showing the engine piston heading to the top dead center.

As illustrated in FIG. 7, when the piston 13 of the reciprocating engine 1 is heading to the TDC, the gas discharged in the combustion chamber 11 of the cylinder bore 10 is compressed, wherein a load applied to the piston 13 is rapidly increased. In this case, the phase of the piston 13, i.e., the phase of the rotor 21 may be instantly delayed relative to the phase of the rotational magnetic field generated at the stator coils 20, In light of foregoing, according to the embodiment of the present invention, when the piston 13 of the reciprocating engine 1 is heading to the TDC, it is preferable that the speed of the rotational magnetic field at the stator coils 20 is decreased in the following manner as a non-limiting example. That is, the gate pulse generating circuit 42 controls the timing of the gate pulse signals S2 to be inputted to the gates of the switching elements 35 of the second converter 32 of the inverter 3, wherein frequency of the voltage applied to the stator coils 20 is adjusted to become relatively low.

As described above, if the speed of the rotational magnetic field at the stator coils 20 is decreased when the piston 13 of the reciprocating engine 1 is heading to the top dead center, the phase of the piston 13, i.e., the phase of the rotor 21 can be substantially synchronized with the phase of the rotational magnetic field at the coils 20, thereby enabling to prevent the rotational timing of the rotor 21 from deviating from the speed of the rotational magnetic field at the stator coils 20. Therefore, even if the reciprocating engine 1 has a region including the TDC where the rotational speed of the rotor 21 rapidly and instantly fluctuates, the reciprocating 1 can be effectively started. The gate pulse generating circuit 42 functions as means for controlling a speed of the rotational magnetic field at the stator coils 20 by controlling a frequency of the voltage applied to the stator coils 20.

Figure 8:
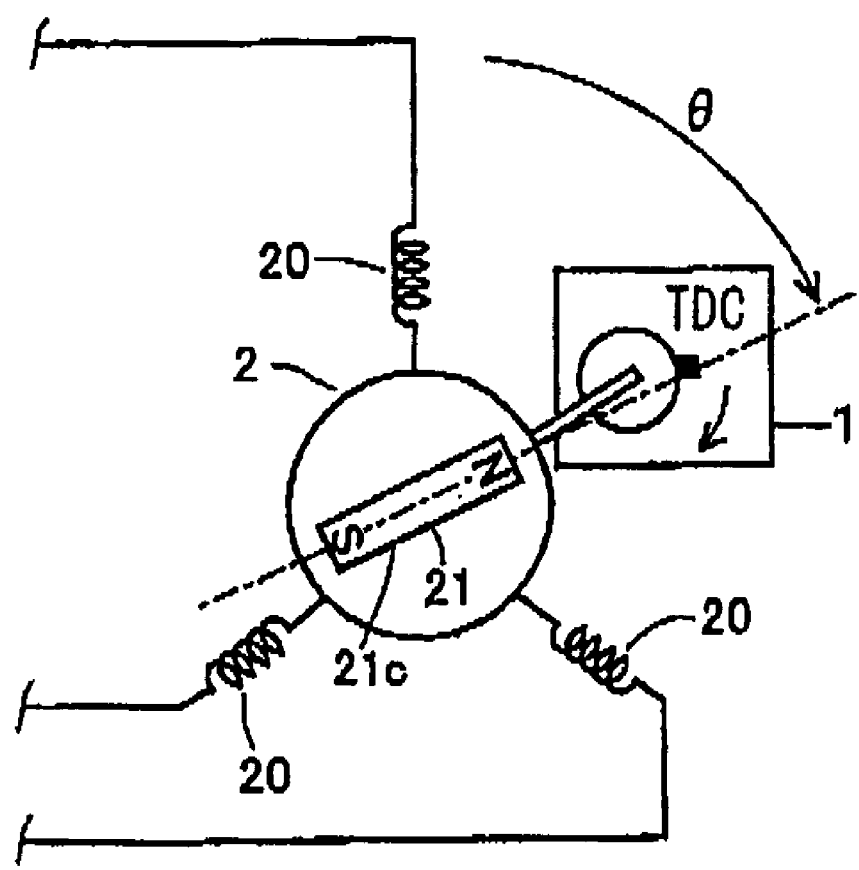
FIG. 8 is a diagram showing the engine piston exceeding the top dead center or the engine piston which has exceeded the top dead center.

As illustrated in FIG. 8, when the piston 13 of the reciprocating engine 1 is exceeding the TDC or has exceeded the TDC, the piston 13 is applied with a combustion pressure of the combustion chamber 11 of the cylinder bore 10. In this case, the phase of the piston 13, i.e., the phase of the rotor 21 may be instantly advanced relative to the phase of the rotational magnetic field generated at the stator coils 20. In light of foregoing, according to the embodiment of the present invention, when the piston 13 of the reciprocating engine 1 is exceeding the TDC or has exceeded the TDC, it is preferable that the speed of the rotational magnetic field at the stator coils 20 is increased in the following manner as a non-limiting example. That is, the gate pulse generating circuit 42 controls the timing of the gate pulse signals S2 to be inputted to the gates of the switching elements 35 of the second converter 32 of the inverter 3, wherein the frequency of the voltage applied to the stator coils 20 is adjusted to become relatively high, thereby enabling to prevent the rotational timing of the rotor 21 from deviating from the speed of the rotational magnetic field at the stator coils 20. Therefore, even if the reciprocating engine 1 has a region including the TDC where the rotational speed of the rotor 21 rapidly and instantly fluctuates, the reciprocating 1 can be effectively started.

As described above, according to the embodiment of the present invention, even if the rotational speed of the rotor 21 rapidly and instantly fluctuates when the piston 13 is positioned in vicinity of the TDC, the phase of the rotor can be substantially synchronized with the phase at the stator coils 20. This is because the current position of the rotor 21 can be detected at a relatively high speed by the phase difference detecting circuit 40 which recognizes the phase difference between a phase of the alternate voltage wave generated at the stator coil following the rotation of the rotor and a phase of a reference alternate voltage.

As described above, according to the embodiment of the present invention, each of the switching elements 34 and 35 is formed by use of the IGBT. However, each of them can be formed with a silicon-controlled rectifier.

The principles, the preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fill within the spirit and scope of the present invention as defined in the claims, be embraced thereby.

The invention claimed is:

1. A reciprocating engine type electric generator comprising:
    a reciprocating engine including at least one cylinder block having a cylinder bore, and a piston disposed in the cylinder bore of the cylinder block and reciprocating between a top dead center and a bottom dead center;
    an electric generator including at least one stator coil and a rotor connected to the reciprocating engine and mounted with at least one permanent magnet rotated following the reciprocation of the piston, wherein the electric generator generates an alternate voltage at the stator coil following the rotation of the rotor;
    means for recognizing a phase difference between a phase of the alternate voltage wave generated at the stator coil following the rotation of the rotor and a phase of a reference alternate voltage;
    means for controlling a speed of a rotational magnetic field generated at the stator coil by controlling the alternate voltage applied to the stator coil based upon the phase difference recognized by the means for recognizing the phase difference.

2. A reciprocating engine type electric generator according to claim 1, wherein the means for controlling the speed of the rotating magnetic field generated at the stator coil controls the alternate voltage to be applied to the stator coil so as to decrease the speed of the rotating magnetic field at the stator coil when the piston of the reciprocating engine is heading to the top dead center.

3. A reciprocating engine type electric generator according to claim 2, wherein the means for controlling the speed of the rotating magnetic field decreases a frequency of the alternate voltage to be applied to the stator coil when the means for recognizing the phase difference recognizes the rotor positioned within a range corresponding to the piston heading to the top dead center.

4. A reciprocating engine type electric generator according to claim 3, wherein the means for controlling the speed of the rotating magnetic field is a gate pulse generating circuit adjusted to feed at lest one gate pulse for decreasing the frequency of the alternate voltage to an inverter applying the alternate voltage to the stator coil.

5. A reciprocating engine type electric generator according to claim 1, wherein the means for controlling the speed of the rotational magnetic field controls the alternate voltage to be applied to the stator coils so as to increase the speed of the rotational magnetic field at the stator coils when the piston of the reciprocating engine is exceeding the top head center or when the piston of the reciprocating engine has exceeded the top head center.

6. A reciprocating engine type electric generator according to claim 5, wherein the means for controlling the speed of the rotational magnetic field increases the frequency of the alternate voltage to be applied to the stator coils when the means for recognizing the phase difference recognizes the rotor positioned within a range where the piston of the reciprocating engine is exceeding the top head center or where the piston of the reciprocating engine has exceeded the top end center.

7. A reciprocating engine type electric generator according to claim 6, wherein the means for controlling the speed of the rotational magnetic field is a gate pulse generating circuit adjusted to feed at least one gate pulse for increasing the frequency of the alternate voltage to an inverter for applying the alternate voltage to the stator coils.

8. A reciprocating engine type electric generator according to claim 2, wherein the means for controlling the speed of the rotational magnetic field controls the alternate voltage to be applied to the stator coils so as to increase the speed of the rotational magnetic field at the stator coils when the piston of the reciprocating engine is exceeding the top head center or when the piston of the reciprocating engine has exceeded the top head center.

9. A reciprocating engine electric generator according to claim 8, wherein the means for controlling the speed of the rotational magnetic field increases the frequency of the alternate voltage to be applied to the rotor when the means for recognizing the phase difference recognizes the stator coils positioned within a range where the piston of the reciprocating engine is exceeding the top head center or when the piston of the reciprocating engine has exceeded the top end center.

10. A reciprocating engine type electric generator according to claim 9, wherein the means for controlling the speed of the rotational magnetic field is a gate pulse generating circuit adjusted to feed at least one gate pulse for increasing the frequency of the alternate voltage to an inverter for applying the alternate voltage to the stator coils.

11. A reciprocating engine type electric generator according to claim 1, wherein the stator coil is divided into three coil portions for generating a first three-phase alternate voltage, a second three-phase alternate voltage and a third three-phase alternate voltage, and the means for recognizing the phase difference includes:
    a different phase alternate voltage wave generating circuit for generating a first different phase alternate voltage wave of which phase is different from a phase of the first three-phase alternate voltage, a second different phase alternate voltage wave of which phase is different from a phase of the second three-phase alternate voltage, and a third different phase alternate voltage wave of which phase is different from a phase of the third three-phase alternate voltage;
    a first Exclusive-OR circuit for generating an Exclusive-OR output with a square wave of the first reference three-phase alternate voltage compared to the first three-phase alternate voltage and a square wave of the first different phase alternate voltage wave;
    a second Exclusive-OR circuit for generating an Exclusive-OR output with a square wave of the second reference three-phase alternate voltage compared to the second three-phase alternate voltage and a square wave of the second different phase alternate voltage wave;
    a third Exclusive-OR circuit for generating an Exclusive-OR output with a square wave of the third reference three-phase alternate voltage compared to the third three-phase alternate voltage and a square wave of the third different phase alternate voltage wave; and
    an adding circuit for summing the output wave of the first Exclusive-OR circuit, the output wave of the second Exclusive-OR circuit, and the output wave of the third Exclusive-OR circuit, wherein the adding circuit outputs a phase difference between the phase of the three-phase alternate voltage generated at the stator coil and the phase of the reference alternate voltage.

12. A reciprocating engine type electric generator according to claim 2, wherein the stator coil is divided into three coil portions for generating a first three-phase alternate voltage, a second three-phase alternate voltage and a third three-phase alternate voltage, and the means for recognizing the phase difference includes:
 a different phase alternate voltage wave generating circuit for generating a first different phase alternate voltage wave of which phase is different from a phase of the first three-phase alternate voltage, a second different phase alternate voltage wave of which phase is different from a phase of the second three-phase alternate voltage, and a third different phase alternate voltage wave of which phase is different from a phase of the third three-phase alternate voltage;
 a first Exclusive-OR circuit for generating an Exclusive-OR output with a square wave of the first reference three-phase alternate voltage compared to the first three-phase alternate voltage and a square wave of the first different phase alternate voltage wave;
 a second Exclusive-OR circuit for generating an Exclusive-OR output with a square wave of the second reference three-phase alternate voltage compared to the second three-phase alternate voltage and a square wave of the second different phase alternate voltage wave;
 a third Exclusive-OR circuit for generating an Exclusive-OR output with a square wave of the third reference three-phase alternate voltage compared to the third three-phase alternate voltage and a square wave of the third different phase alternate voltage wave; and
 an adding circuit for summing the output wave of the first Exclusive-OR circuit, the output wave of the second Exclusive-OR circuit, and the output wave of the third Exclusive-OR circuit, wherein the adding circuit outputs a phase difference between the phase of the three-phase alternate voltage generated at the stator coil and the phase of the reference alternate voltage.

13. A reciprocating engine type electric generator according to claim 5, wherein the stator coil is divided into three coil portions for generating a first three-phase alternate voltage, a second three-phase alternate voltage and a third three-phase alternate voltage, and the means for recognizing the phase difference includes:
 a different phase alternate voltage wave generating circuit for generating a first different phase alternate voltage wave of which phase is different from a phase of the first three-phase alternate voltage, a second different phase alternate voltage wave of which phase is different from a phase of the second three-phase alternate voltage, and a third different phase alternate voltage wave of which phase is different from a phase of the third three-phase alternate voltage;
 a first Exclusive-OR circuit for generating an Exclusive-OR output with a square wave of the first reference three-phase alternate voltage compared to the first three-phase alternate voltage and a square wave of the first different phase alternate voltage wave;
 a second Exclusive-OR circuit for generating an Exclusive-OR output with a square wave of the second reference three-phase alternate voltage compared to the second three-phase alternate voltage and a square wave of the second different phase alternate voltage wave;
 a third Exclusive-OR circuit for generating an Exclusive-OR output with a square wave of the third reference three-phase alternate voltage compared to the third three-phase alternate voltage and a square wave of the third different phase alternate voltage wave; and
 an adding circuit for summing the output wave of the first Exclusive-OR circuit, the output wave of the second Exclusive-OR circuit, and the output wave of the third Exclusive-OR circuit, wherein the adding circuit outputs a phase difference between the phase of the three-phase alternate voltage generated at the stator coil and the phase of the reference alternate voltage.

14. A reciprocating engine type electric generator according to claim 8, wherein the stator coils are divided into three coil portions for generating a first three-phase alternate voltage, a second three-phase alternate voltage and a third three-phase alternate voltage, and the means for recognizing the phase difference includes:
 a different phase alternate voltage wave generating circuit for generating a first different phase alternate voltage wave of which phase is different from a phase of the first three-phase alternate voltage, a second different phase alternate voltage wave of which phase is different from a phase of the second three-phase alternate voltage, and a third different phase alternate voltage wave of which phase is different from a phase of the third three-phase alternate voltage;
 a first Exclusive-OR circuit for generating an Exclusive-OR output with a square wave of the first reference three-phase alternate voltage compared to the first three-phase alternate voltage and a square wave of the first different phase alternate voltage wave;
 a second Exclusive-OR circuit for generating an Exclusive-OR output with a square wave of the second reference three-phase alternate voltage compared to the second three-phase alternate voltage and a square wave of the second different phase alternate voltage wave;
 a third Exclusive-OR circuit for generating an Exclusive-OR output with a square wave of the third reference three-phase alternate voltage compared to the third three-phase alternate voltage and a square wave of the third different phase alternate voltage wave; and
 an adding circuit for summing the output wave of the first Exclusive-OR circuit, the output wave of the second Exclusive-OR circuit, and the output wave of the third Exclusive-OR circuit, wherein the adding circuit outputs a phase difference between the phase of the three-phase alternate voltage generated at the stator coil and the phase of the reference alternate voltage.

15. A reciprocating engine type electric generator according to claim 4, wherein the inverter comprises:
 a first converter for rectifying the alternate voltage from an electric power supply into a direct-current voltage to be supplied to the stator coil when the reciprocating engine is activated;
 a condenser for reducing a ripple contained in the direct-current voltage; and
 a second converter for rectifying the direct-current voltage into the alternate voltage when the reciprocating engine is activated,
wherein the second converter rectifies the alternate voltage generated at the stator coil into a direct-current voltage when an electricity generated at the electric generator is extracted, the condenser reduces a ripple contained in the direct-current voltage, and the first converter rectifies the direct-current voltage into the alternate voltage when the electricity generated at the electric generator is extracted.

16. A reciprocating engine type electric generator according to claim 7, wherein the inverter comprises:

a first converter for rectifying the alternate voltage from an electric power supply into a direct-current voltage to be supplied to the stator coil when the reciprocating engine is activated;

a condenser for reducing a ripple contained in the direct-current voltage; and a second converter for rectifying the direct-current voltage into the alternate voltage when the reciprocating engine is activated, wherein the second converter rectifies the alternate voltage generated at the stator coil into a direct-current voltage when an electricity generated at the electric generator is extracted, the condenser reduces a ripple contained in the direct-current voltage, and the first converter rectifies the direct-current voltage into the alternate voltage when the electricity generated at the electric generator is extracted.

17. A reciprocating engine type electric generator according to claim 10, wherein the inverter comprises:

a first converter for rectifying the alternate voltage from an electric power supply into a direct-current voltage to be supplied to the stator coil when the reciprocating engine is activated;

a condenser for reducing a ripple contained in the direct-current voltage; and a second converter for rectifying the direct-current voltage into the alternate voltage when the reciprocating engine is activated, wherein the second converter rectifies the alternate voltage generated at the stator coil into a direct-current voltage when an electricity generated at the electric generator is extracted, the condenser reduces a ripple contained in the direct-current voltage, and the first converter rectifies the direct-current voltage into the alternate voltage when the electricity generated at the electric generator is extracted.

* * * * *